United States Patent [19]

Albrecht

[11] Patent Number: 5,070,642
[45] Date of Patent: Dec. 10, 1991

[54] TREE ROOT DEFLECTOR INSTALLATION

[75] Inventor: Leonard N. Albrecht, Irvine, Calif.

[73] Assignee: Deep Root Corporation, Westminster, Calif.

[21] Appl. No.: 89,213

[22] Filed: Aug. 25, 1987

[51] Int. Cl.$^5$ .............................................. A47G 17/00
[52] U.S. Cl. ........................................... 47/25; 47/33; 405/285; 405/279
[58] Field of Search ...................... 160/223, 229.1, 228, 160/236; 405/285, 284, 277, 286, 279, 281, 276; 47/33, 83, 23, 18, 32, 25; 52/580; 256/13.1

[56] References Cited

U.S. PATENT DOCUMENTS

| | | | |
|---|---|---|---|
| 933,654 | 9/1909 | Lippincott | 47/23 |
| 1,030,761 | 6/1912 | Archer | 405/277 |
| 3,415,013 | 12/1968 | Galbraith | 47/33 |
| 3,472,133 | 10/1969 | Ziehm | 47/33 |
| 3,951,294 | 4/1976 | Wilson | 47/33 |
| 4,019,279 | 4/1977 | Moorman | 47/25 |
| 4,281,473 | 8/1981 | Emalfarb et al. | 47/33 |
| 4,321,769 | 3/1982 | Tisbo et al. | 47/33 |
| 4,644,685 | 2/1987 | Tisbo et al. | 47/33 |
| 4,647,491 | 3/1987 | Ireland et al. | 47/33 |
| 4,665,645 | 5/1987 | Schau et al. | 47/33 |

FOREIGN PATENT DOCUMENTS

| | | | |
|---|---|---|---|
| 258582 | 5/1928 | Italy | 405/277 |
| 2029187 | 3/1980 | United Kingdom | 47/83 |

Primary Examiner—Danton D. DeMille
Attorney, Agent, or Firm—Allan R. Fowler

[57] ABSTRACT

A tree root deflector is installed in a ground planting location between a tree and a sidewalk or other static structure for training tree rootlets downwardly so as to emerge beneath the deflector for subsequent lateral growth and enlargement at a safe depth beneath such structure. The deflector includes a plastic panel having a plurality of vertical root deflecting ridges protruding abruptly from the tree side of the panel at horizontally spaced apart locations for deflecting tree rootlets downwardly, as well as a plurality of transverse abrupt ridges protruding from the same side of the panel at horizontally spaced apart locations disposed intermediate the vertical ridges to lock the panel with the tree roots and with the ground, the transverse ridges being relatively short so as to leave substantial spaces between them and the adjacent vertical ridges. Panels may be rectangular or trapezoidal and interconnected in a straight path, or so as to circumscribe the tree in a cylindrical or in a flared manner, the side edge margins of the panels being formed by elongated "T" section connector rails which mate with corresponding connector sleeves to interconnect the panels and provide abrupt tortuous paths resisting penetration by tree rootlets through such interconnections.

6 Claims, 2 Drawing Sheets

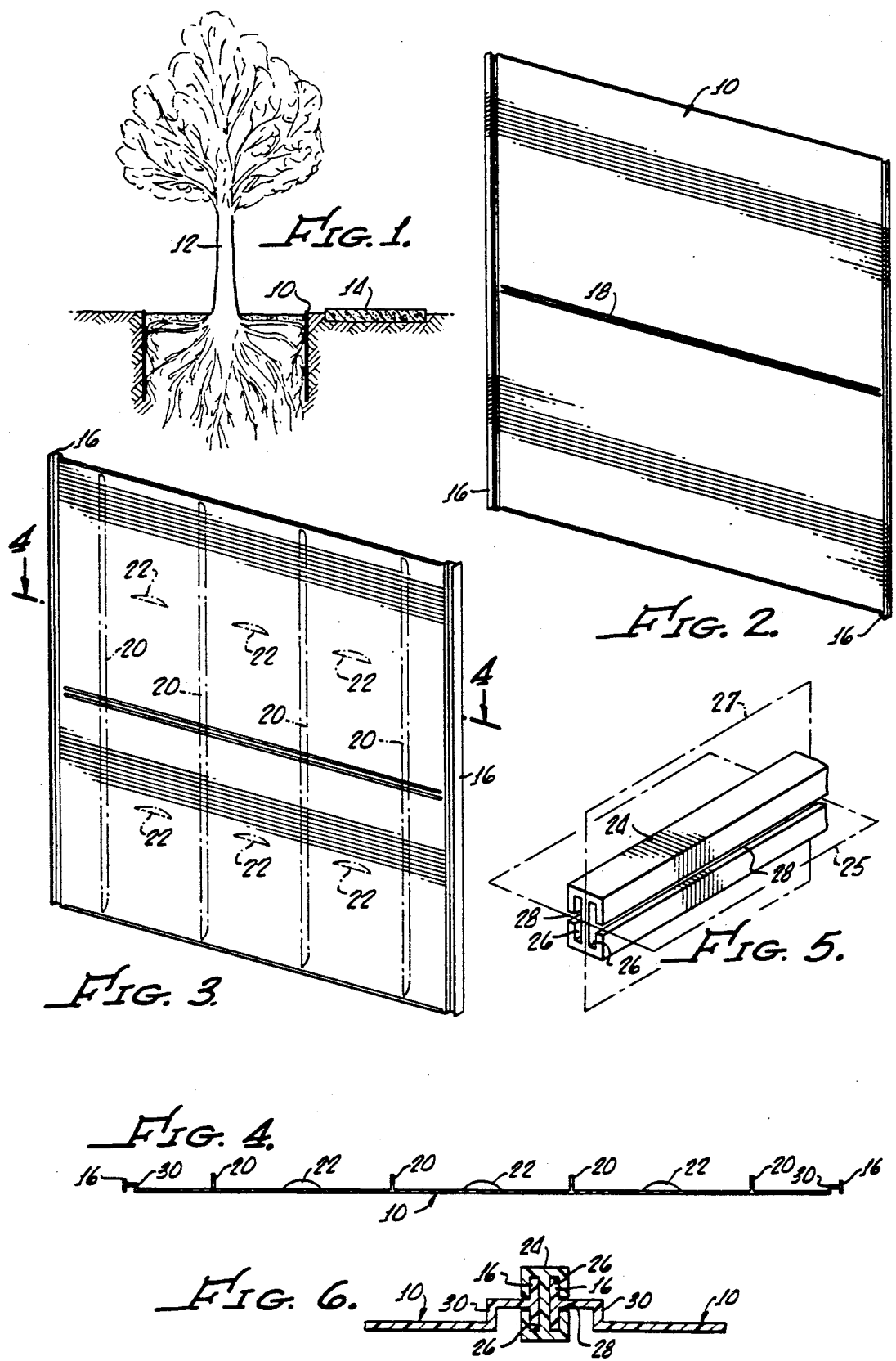

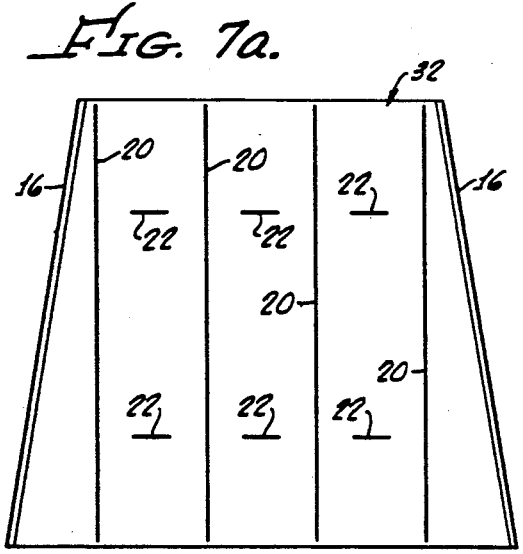
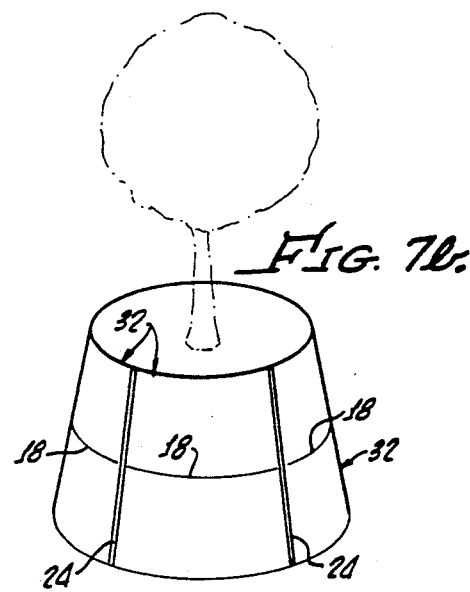
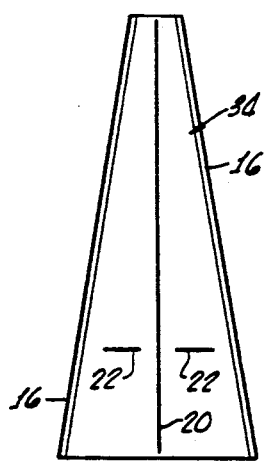
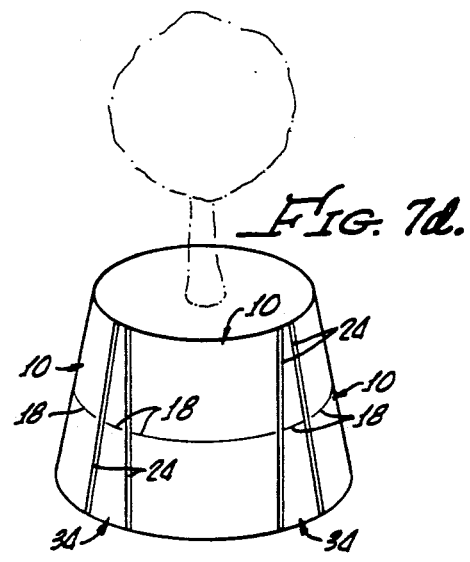
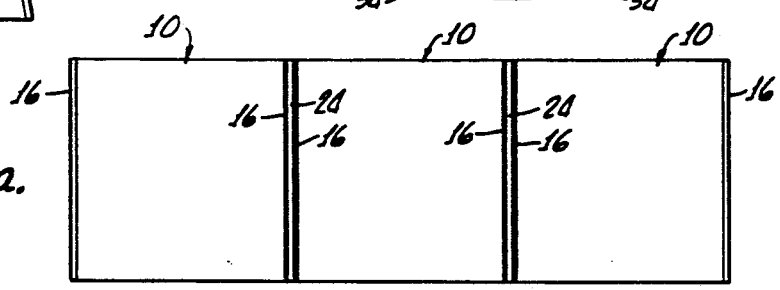
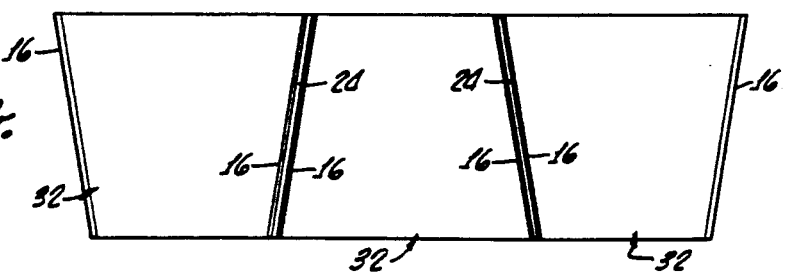

TREE ROOT DEFLECTOR INSTALLATION

This invention relates to root deflector installations for trees of a kind whose roots can reach and crack a nearby static structure such as a sidewalk, and has particular reference to deflectors which train the roots downwardly to emerge beneath the deflector for subsequent lateral growth and enlargement at a safe depth beneath such structure. Such deflection and training avoids the danger of cracking or upheaving the static structure, and enhances the health and growth of the tree and its proper anchoring in the soil.

The general concept for such training of tree roots is described in U.S. Pat. No. 4,019,279, issued Apr. 26, 1977. The principal object of the present invention is to provide improvements to the deflector structure so as to enhance and facilitate its trouble-free shipping and installation, and its in-ground placement and functioning.

Each root deflector installation is comprised of a series of interconnected deflector panels. Each panel is made of a smooth and nonporous material, preferably polypropylene plastic chosen or compounded to withstand very considerable exposure to ultraviolet radiation without suffering significant deterioration.

Such polypropylene plastic can be injected molded to form the deflector panels, with sufficient wall thickness to insure that no pin holes remain in the wall through which a rootlet can find its way and subsequently enlarge. A wall thickness of about 0.80 inches appears appropriate for panels which are to extend from ground level to a depth of one to two feet. This results in a structure which is tough, somewhat flexible, and non-brittle. These attributes help to maintain the integrity and function of the panel in the face of the rough handling and abuse which is commonplace and inevitable in and around construction sites.

It is an object of the present invention to improve upon the deflector panels of U.S. Pat. No. 4,019,279 by further providing ground locks on the deflector panel. Such ground locks help prevent the deflector panel itself from being forced out of the ground by the roots which it deflects therebeneath. The ground locks further prevent other easy removal from the ground, as by vandals.

It is a further object of the present invention to provide an improved connector structure for connecting the panels together into a deflector which reduces or eliminates installation errors. Such errors are reduced or eliminated by: (a) forming the connector in the shape of an extrusion, which eliminates the distinction between top and bottom; (b) making the connector symmetric about the central vertical plane perpendicular to the plane of the panels, which eliminates the distinction between left and right; and (c) making the connector symmetric about the central vertical plane parallel to the plane of the panels, which eliminates the distinction between tree side and sidewalk side. The connector may thus be installed upside down, inside out, and backwards without any untoward effect.

It is a further object of the present invention to provide an improved connector structure for connecting the panels together into a deflector which, in conjunction with the tough, somewhat flexible nature of its material, provides a secure and properly functioning structure without cement.

It is yet another object of the present invention to provide an improved panel structure by arranging the ridges, ground locks, and connectors so that the panels may be conveniently stacked, in interlocking relationship, in a small volume.

These and other objects of the invention will be apparent from the following detailed description of a preferred embodiment of the invention, made with reference to the accompanying drawings, in which:

FIG. 1 is an elevation, partly in section, of a tree root deflector installation according to the present invention, deflecting tree roots downward to a safe depth for subsequent lateral growth and enlargement under a sidewalk;

FIG. 2 is a perspective view of the rear (sidewalk side) of a deflector panel of the type used in the installation of FIG. 1;

FIG. 3 is also a perspective view of the rear of the panel of FIG. 2, showing (in phantom) the front (tree side) of the panel;

FIG. 4 is a cross section of a panel taken along line 4—4 of FIG. 1;

FIG. 5 is a perspective view of a sleeve connector for adjacent panels;

FIG. 6 is a fragmentary sectional elevation of the sleeve connector of FIG. 5 in engagement with the connector rails formed at the proximate edge margins of adjacent panels;

FIGS. 7a, 7b, 7c and 7d are side views of trapezoidal panels and gussets, and perspective views of a tree completely surrounded by same; and, FIG. 8 is a side view of an extended wall made up of panels in the shape of (a) rectangles, or (b) trapezoids.

Turning now to FIG. 1, a panel 10 lies between a tree 12 and a sidewalk 14 and extends from near ground level to a depth greater than that of the sidewalk. The panel 10 comprises a sheet or wall of polyethylene plastic about two feet square and three-sixteenths inch thick. One side faces the tree 12; the other side faces the sidewalk 14.

As shown in FIG. 2, a connector rail 16, integral to the panel 10, runs along the vertical left and right edge margins of the panel 10. No rails 16 is required for the horizontal top and bottom edges of the panel 10. A horizontal cut line 18 is impressed in the middle of the back of the panel 10, to allow the panel 10 to be cut into two smaller panels. Each smaller panel is two feet long, but only one foot deep, an appropriate depth for protecting shallow structures.

As shown in the panel's perspective view in FIG. 3, and the cross section thereof in FIG. 4, a plurality, shown here as four, of integral, elongated, approximately vertical root deflection ridges 20 protrude abruptly from the tree side of the panel 10. The vertical ridges 20 are in the shape of rectangular parrallelepipeds, except that the external edges are rounded to prevent injury to the installation workers. The vertical ridges 20 extend from close to the top of the panel 10 to close to the bottom thereof, are about one-eighth inch thick, and protrude about one-half inch approximately at right angles from the wall surface of the panel 10.

The vertical ridges 20 are spaced such that, when the panel 10 is joined side by side to another similar panel 10, the ridges 20 of the combined wall will be equally spaced; that is, the ridges 20 are spaced at three, nine, fifteen, and twenty-one inches from the left edge of the panel 10, the right edge of the panel 10 being twenty-four inches from the left edge of the panel 10.

Integral transverse ridges or ground locks 22 protrude abruptly from the same front side of the panel 10, at horizontally spaced apart locations disposed intermediate each pair of adjacent vertical ridges 20. They protrude from the tree side of the panel 10, so that they may lock onto the roots in the ground as well as the soil. The transverse ridges 22 are in the form of abrupt shelves, about one-eighth inch thick, and have an elevation approximately in the shape of segment of a circle, the chord of the segment joining the wall of the panel 10. The chord is about two inches long, and the ground locks 22 protrude about three-eighths inch from the panel 10.

As above described, and as seen in FIGS. 3 and 4, the transverse ridges 22 are relatively short compared to the horizontal spacing between adjacent vertical ridges 20, thus leaving substantial spaces between them and the adjacent vertical ridges, hence ample room for tree rootlets to follow the panel wall downwardly. After striking the vertical panel wall, most surviving tree rootlets will turn along the wall toward one of the vertical ridges 20 and thereafter turn downwardly when they strike one of the vertical ridges. Such tree rootlets as may grow downwardly along the panel wall and strike the transverse ridges 22 will be turned along the panel wall toward the adjacent vertical ridges, thence downwardly. The ground locks 22 are therefore made large enough to capture a sufficient root mass to enhance their locking ability, without capturing so much of the root mass as to keep a significant number of roots from growing downward and underneath the panel 10. The dimensions given above represent an acceptable compromise.

The total space between each pair of adjacent vertical ridges 20 includes two transverse ridges or ground locks 22. One ground lock 22 is located six inches below the top of the panel 10; the other ground lock 22 is located six inches above the bottom of the panel 10. This allows a ground lock 22 to be centered in each inter-ridge space of each section of the panel 10 if the panel 10 is cut into two sections along the cut line 18. The described location of the vertical and transverse ridges allows two identical panels 10 to be stacked front to front (tree side to tree side) and slightly offset vertically and horizontally to save shipping space. In this configuration the ground locks 22 and vertical ridges 20 of the respective panels nest, and those of one panel 10 avoid interference with either the vertical ridges 20 or the ground locks 22 of the other panel and as can be seen by inspection from FIGS. 3 and 4, the same is true for the below described connector rails formed at the left and right edge margins of the panels 10.

A connector sleeve 24 is extruded from a plastic material, preferably the same as that of the panel 10, and is as long as the panel 10 is high. The connector sleeve 24 is symmetric both about orthogonal planes 25, 27 through its center. It has a uniform cross section in the shape of two squared off C's, back to back. More particularly, the cross sectional shape is that of a rectangle, about five-eighths inch by three-eighths inch, with separate open slots 28 extending centrally along each of opposite sides of the connector sleeve 24 for the full length thereof. Each open slot 28 is about 1/16th inch wide at the exterior of the sleeve 24 and has an interior cross portion 26, so that overall each slot has a sharpely defined, squared off "T" shaped cross-section.

As seen in FIGS. 3, 4 and 6, the right and left opposite edge margins of the panel 10 are each formed by an integral elongated connector rail extending from top to bottom of the panel, each connector rail having a head portion 16 and a supporting base portion 30. The head portion 16 of each connector rail has a sharply defined "T" shaped cross section and is dimensioned to snugly mate with the "T" shaped cross section of either of the open slots 28 in the connector sleeve 24.

The head portion 16 of each connector rail is offset from the panel 10, in the direction of the tree, by its supporting base portion 30. The base portion 30 is integral to the panel 10 and the head portion 16. It is a rectangular parrallelepiped, extending the height of the panel 10, protruding abruptly toward the tree from the same side of the panel as the vertical and transverse ridges 20, 22 by a distance of about one-fourth inch. As best seen in FIG. 6, the cross of the "T" shaped cross-section of the head portions 16 of the connector rails extend transverse to the panel wall 10 at a forwardly offset position with the connector rails of adjacent panels being proximate and their respective head portions 16 being caught respectively in the separate slots 28 formed on opposite sides of the same connector sleeve 24.

The protruding base portion 30 of each connector rail makes it more difficult for a root to penetrate between panels 10, because it presents a vertical ridge and acts as a root deflector. By forwardly offsetting the head portion 16 of the connector rail from the panel, it keeps the head portion 16 from protruding on the sidewalk side of the panel 10. Thus, panels 10 can be nested in pairs, tree side to tree side, and the pair will display only smooth external surfaces.

While the connector structure minimizes the possibility, any tree rootlet attempting to directly penetrate between the panel 10 and the connector 24 would be required to make a number of sharp turns through the mating "T" shaped cross-sections and would even be required to grow toward the tree in order to reach the rear or sidewalk side of the panels. This path is so tortuous as to be doubtful for even the most determined root. Further, when adjoining panels 10 are bent into a circle around a tree 12 (see FIG. 6, arrows A), the mating surfaces of the connector rails and connector 24 are forced against each other, making penetration even more difficult.

When panels are connected to surround a tree, the bottoms of the panels may be made to flare away from the tree by connecting together panels 32 which are trapezoidal rather than rectangular, FIGS. 7a and 7b. A trapezoidal panel 32 is identical to a rectangular panel 10, except that each connector rail runs diagonally, with its bottom position unchanged, but with its top located adjacent the top of the closest vertical ridge 20. Thus, the opposite edge margins of the panels 32 make an angle B with the vertical. This results in a plurality of panels 32 approximating a downwardly expanding frustum of a hollow cone with a small angle C from the vertical, such that the panels 32 are only approximately vertical.

Alternatively, rectangular panels 10 may be joined to trapezoidal gussets 34, FIGS. 7c and 7d. A gusset 34 is the same as a trapezoidal panel 32, except that it is narrower, more triangularly shaped and has only one central vertical ridge 20. The side edges make an angle D with the vertical. This results in a plurality of panels and gussets again approximating the frustum of a cone with a small angle E from the vertical.

When panels are connected to run beside a sidewalk, rectangular panels 10 may be joined together, FIG. 8a.

Alternatively, trapezoidal panels 32 may be joined with adjacent panels inverted top to bottom, FIG. 8b.

What is claimed is:

1. In a ground planting location near a sidewalk or other static structure which can be damaged by the root of a tree, and which also includes a tree planted on said location, said tree of a kind whose lateral roots can reach and damage the structure, a root deflector disposed in the ground between said tree and said structure and extending approximately vertically from near ground level to a depth greater than that of said structure for training root growth downwardly for subsequent lateral growth and enlargement beneath the deflector, said root deflector comprising:
   (a) at least one panel having a continuous wall of smooth, non-porous, plastic material;
   (b) a plurality of elongated approximately vertical, root deflecting ridges respectively protruding abruptly from one side of the panel wall at horizontally spaced apart locations for deflecting tree rootlets downwardly; and,
   (c) a plurality of transverse ridges respectively protruding abruptly from the same side of the panel wall at horizontally spaced apart locations disposed intermediate said vertical ridges for locking the panel with the tree roots and ground, said transverse ridges being relatively short so as to leave substantial spaces between them and the adjacent vertical ridges;
   (d) said same side of the panel wall from which said vertical and transverse ridges protrude being installed facing toward the tree, whereby tree rootlets are diverted by the panel toward the vertical ridges, and thence downwardly to emerge beneath the panel for subsequent lateral growth and enlargement at a safe depth so as to avoid damage to said structure while aiding the tree, and whereby the panel's resistance to being extruded from the ground by such subsequent lateral root growth and enlargement beneath the panel is enhanced as a result of the locking action of the transverse ridges with the ground and tree roots.

2. The apparatus of claim 1 wherein said root deflector includes an interconnected plurality of aligned panels which define the horizontal extent of the deflector, and wherein:
   (a) each panel has right and left opposite edge margins, said edge margins each being formed by an elongated connector rail extending from top to bottom of the panel, each connector rail having a head portion and a supporting base portion, each base portion protruding abruptly from the panel wall on the same side as the vertical and transverse ridges, and supporting the associated head portion in a correspondingly offset position;
   (b) the corresponding offset head portions of the connector rails of the respective panels being disposed immediately proximate to and in parallel alignment with those of adjacent panels of the deflector; and,
   (c) a plurality of sleeve means respectively engaged along the offset head portions of the proximate connector rails of adjacent panels, for interconnecting said panels.

3. The apparatus of claim 2, wherein:
   (a) the offset head portions of the elongated connector rails each have a squared off, sharply connector rails each have a squared off, sharply defined "T"-shaped cross-section with the cross of the "T" extending in the direction transverse to the panel wall; and, wherein
   (b) the sleeve means comprises an elongated plastic sleeve having a pair of separate open slots extending the length thereof, said slots being respectively disposed on opposite sides thereof, and said slots being correspondingly "T"-shaped in cross-section and snugly mating with the "T"-shaped head portions of the connector rails of adjacent panels, so as to present a tortuous path which resists rootlet penetration.

4. The apparatus of claim 3, wherein:
   (a) the opposite edge margins of said panels slant outward from top to bottom beginning at the top of the adjacent vertical ridge, whereby each panel is trapezoidal; and, wherein
   (b) each panel is connected with adjacent panels to form a barrier in the approximate shape of a downwardly expanding frustum of a hollow cone surrounding the tree.

5. The apparatus of claim 4, wherein:
   (a) the opposite edge margins of said panels slant outward from top to bottom beginning at the top of the adjacent vertical ridge, whereby each panel is trapezoidal; and, wherein
   (b) adjacent panels are inverted top to bottom to form a horizontally elongated linear deflector.

6. The apparatus of claim 5, wherein:
   (a) the interconnected panels are alternately rectangular and trapezoidal to form a barrier;
   (b) wherein each trapezoidal panel is relatively narrow and has at least one of said vertical ridges protruding therefrom at a location between the opposite edge margins thereof; and,
   (c) wherein each rectangular panel is relatively wide and has said plurality of vertical and transverse ridges protruding therefrom at said horizontally spaced apart locations.

* * * * *